United States Patent [19]

Kinoshita

[11] Patent Number: 5,265,220
[45] Date of Patent: Nov. 23, 1993

[54] ADDRESS CONTROL DEVICE FOR EFFECTIVELY CONTROLLING AN ADDRESS STORING OPERATION EVEN WHEN A REQUEST IS SUBSEQUENTLY CANCELLED

[75] Inventor: Kouji Kinoshita, Tokyo, Japan

[73] Assignee: NEC Corporation, Tokyo, Japan

[21] Appl. No.: 549,623

[22] Filed: Jul. 9, 1990

Related U.S. Application Data

[63] Continuation of Ser. No. 136,755, Dec. 22, 1987, abandoned.

Foreign Application Priority Data

Dec. 23, 1986 [JP] Japan ............................. 61-307361

[51] Int. Cl.⁵ ............................................. G06F 12/10
[52] U.S. Cl. ................................. 395/400; 395/375;
395/425; 364/238.4; 364/243; 364/243.41;
364/256.3; 364/256.4; 364/261.3; 364/261.5;
364/261.7; 364/DIG. 1
[58] Field of Search ............... 364/DIG. 1, DIG. 2;
395/375, 400, 425, 700, 725

[56] References Cited

U.S. PATENT DOCUMENTS

| | | | |
|---|---|---|---|
| 4,390,946 | 6/1983 | Lane | 364/200 |
| 4,430,706 | 2/1984 | Sand | 364/200 |
| 4,521,851 | 6/1985 | Trubisky et al. | 364/200 |
| 4,530,052 | 7/1985 | King et al. | 364/200 |
| 4,597,044 | 6/1986 | Circello | 364/200 |
| 4,719,570 | 1/1988 | Kawabe | 364/200 |
| 4,750,112 | 6/1988 | Jones et al. | 364/200 |
| 4,760,519 | 7/1988 | Papworth et al. | 364/200 |
| 4,760,520 | 7/1988 | Shintani et al. | 364/200 |
| 4,777,594 | 10/1988 | Jones et al. | 364/200 |
| 4,853,840 | 8/1989 | Shibuya | 364/200 |
| 4,901,233 | 2/1990 | Liptay | 364/200 |
| 4,954,947 | 9/1990 | Kuriyama et al. | 364/200 |
| 4,991,080 | 2/1991 | Emma et al. | 364/200 |

Primary Examiner—Thomas C. Lee
Assistant Examiner—Maria N. Von Buhr
Attorney, Agent, or Firm—Foley & Lardner

[57] ABSTRACT

In an address control device operable in response to an input virtual address signal to control an access operation to a memory section, an address storing operation is started by an address conversion control section (22) when no real address part is stored in a translation lookaside buffer (21) in correspondence to the input virtual address signal. The address storing operation is continued in the address control device even when a cancellation signal is given from an execution processing unit (12) so as to cancel the access operation, without supply of a request signal to the memory section. For this purpose, an "under operation" signal is produced from an "under operation" flip-flop (46) during the address storing operation to reject reception of the cancellation signal and to hold the input virtual address in a virtual address register (20).

3 Claims, 6 Drawing Sheets

ADDRESS CONTROL DEVICE FOR EFFECTIVELY CONTROLLING AN ADDRESS STORING OPERATION EVEN WHEN A REQUEST IS SUBSEQUENTLY CANCELLED

This application is a continuation of application Ser. No. 07/136,755, filed Dec. 22, 1987, now abandoned.

BACKGROUND OF THE INVENTION

This invention relates to an address control device for use between an execution processing unit and a memory section in an information processing system.

An information processing system of the type described often adopts pipeline control in order to process a succession of instructions at a high speed. To this end, an execution processing unit carries out prefetch or lookahead of instructions from a main memory prior to execution of the prefetched instructions. This shows that the main memory is inevitably accessed by the execution processing unit.

A virtual address is produced from the execution processing unit on accessing the main memory and must therefore be converted or translated into a corresponding real address of the main memory. In other words, address conversion or translation of a virtual address into a real address is indispensable for such an information processing system and may be made by looking up an address conversion or translation table stored in the main memory. However, such a table look-up makes the pipeline control difficult because the main memory must be accessed each time when the address conversion is carried out.

In order to make the pipeline control possible, an address control device is used to carry out address conversion of a virtual address into a real address at a high speed and is operative in cooperation with a cache memory. A combination of the main memory and the cache memory will be collectively called a memory section.

A conventional address control device comprises a translation-lookaside buffer (TLB) which keeps or stores a predetermined number of entries in relation to virtual addresses already issued from the execution processing unit. With this structure, the translation lookaside buffer is at first looked up by a virtual address and quickly carries out address conversion of the virtual address into a real address as long as an entry is stored in correspondence to the virtual address in question.

Stated otherwise, the address conversion table of the main memory is accessed only in the absence of any entry corresponding to the virtual address in question. This serves to minimize a waste of time which might occur due to an access operation of the main memory.

Herein, let a conditional branch (a branch-on-condition) instruction be prefetched as a prefetched instruction in the execution processing unit. Such a prefetch operation might be carried out about the conditional branch instruction on the assumption that prediction is made about either success, namely, satisfaction of a branch condition or unsuccess, namely, failure of the branch condition. In addition, instructions and operands for the instructions might also be prefetched in the cache memory in accordance with the prediction carried out for the conditional branch instruction. Under the circumstances, such prediction of a branch condition might often be wrong or end in failure.

In a conventional information processing system, the prefetched operands might be cancelled on occurrence of the wrong prediction by sending a cancellation indication from the execution processing unit to the address control device. This serves to avoid supply of the prefetched operands to the execution processing unit in connection with the wrong prediction.

Herein, the address control device carries out an address storing operation for a predetermined duration when the translation lookaside buffer does not store an entry in relation to an input virtual address. When the above-mentioned cancellation indication is supplied from the execution processing unit to the address control device during the address storing operation, the address storing operation might be interrupted in the address control device under way to be cancelled. Such interruption of an address storing operation requires complex control in the address control device.

Moreover, even when prediction is wrong once about a branch condition of a conditional branch instruction, it often happens that similar prediction is judged to be correct when the conditional branch instruction in question is carried out either again or a certain number of times. In this event, a branch operation must be directed towards the previously prefetched operands which have already been cancelled in the translation lookaside buffer. Accordingly, the address storing operation interrupted under way should be redone from a beginning of the address storing operation. This shows that the address storing operation undesirably wastes a time in the address control device, which results in degradation of performance in the information processing system.

SUMMARY OF THE INVENTION

It is an object of this invention to provide an address control device which is capable of reasonably and effectively controlling an address storing operation even when prediction is wrong about a branch condition of a conditional branch instruction in an execution processing unit.

It is another object of this invention to provide an address control device of the type described, which is capable of avoiding a waste of time which might otherwise result from the address storing operation.

It is a further object of this invention to provide an address control device of the type described, which can simplify a control operation therein.

An address control device to which this invention is applicable is for use in controlling an access operation of an execution processing unit to a memory section in response to a succession of indications given from the execution processing unit. The address control device is being supplied from the execution processing unit with an input virtual address included in a current one of the indications and comprises address storing means for storing a plurality of partial virtual address parts and a plurality of real address parts corresponding to the respective virtual address parts to be accessed by the input virtual address and to detect whether or not a real address part is stored in correspondence to the input virtual address in the address storing unit and storing control unit responsive to the input virtual address and coupled to the address storing unit for controlling an address storing operation of the address storing unit in relation to the input virtual address when the real address part in question is not stored in the address storing unit. According to this invention, the address control device comprises validity control unit coupled to the storing control unit and responsive to each of the indications for validating the address storing operation of the address storing unit even on reception of a following one of the indications that indicates cancellation of the access operation.

DESCRIPTION OF THE PREFERRED EMBODIMENTS

Figure 1:
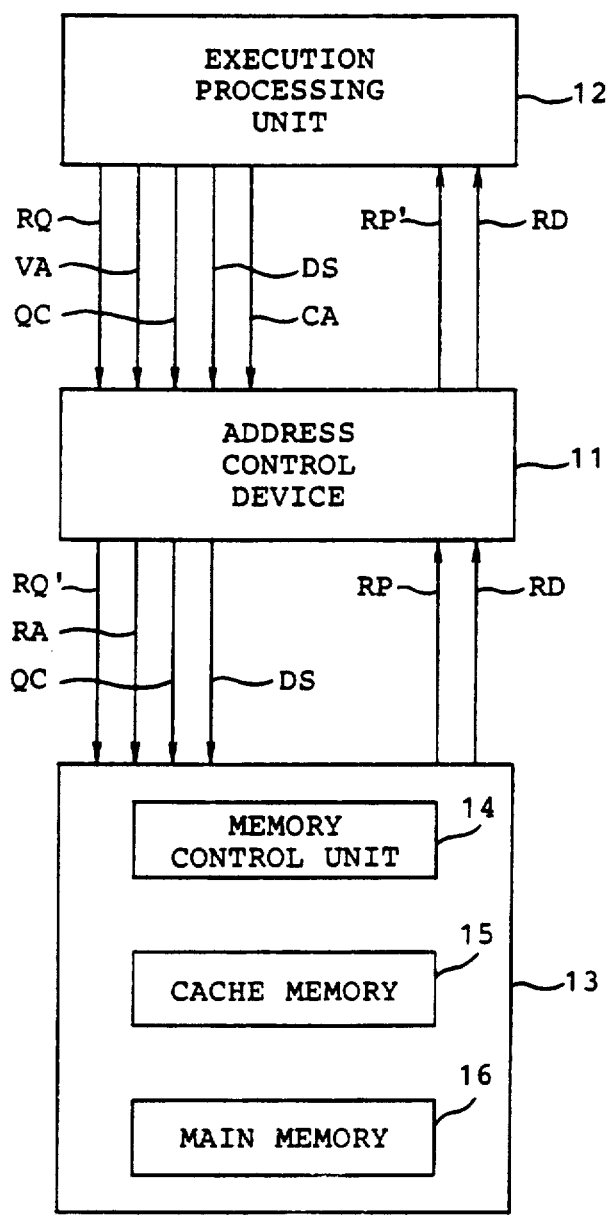
FIG. 1 is a block diagram of an information processing system to which this invention is applicable.

Referring to FIG. 1, an address control device 11 according to a preferred embodiment of this invention is intermediate between an execution processing unit 12 and a memory section 13. The illustrated execution processing unit 12 carries out instruction lookahead control, specifically prefetch control of a succession of instructions which may include conditional branch (branch-on-condition) instruction or instructions and the remaining instructions. The remaining instructions will be called normal instructions. Each of the instructions is executed in the execution processing unit 12 in a known manner. As a result of execution, the execution processing unit 12 supplies the memory section 13 through the address control device 11 with a succession of indications which will be described in the following.

Each indication includes a request signal RQ, a virtual address signal VA indicative of a virtual address, and a request code signal QC representative of a request code. In addition, the indications may selectively comprise a storage data signal DS and a cancellation signal CA. The cancellation signal CA indicates cancellation of an access operation previously requested relative to the memory section 13 and is produced from the execution processing unit 12 when prediction is wrong about a branch operation of each conditional branch instructions, namely, when the prediction is found or decided to be in failure. The virtual address signal VA is delivered only to the address control device 11 and is supplied thence to the memory section 13 as a real address signal RA. The cancellation signal CA is for use only in the address control device 12 in modifying the request signal into a modified request signal RQ'.

Furthermore, the execution processing unit 12 is supplied with a reply signal RP and a readout data signal RD from the memory section 13 through the address control device 11. More specifically speaking, the reply signal RP is delivered to the address control device 11 and delivered thence to the execution processing unit 12 as a controlled reply signal RP'.

In the example being illustrated, the memory section 13 comprises a memory control unit 14, a cache memory 15, and a main memory 16, which are all known in the art. The memory control unit 14 controls the cache memory 15 and the main memory 16 in a known manner. Description will be omitted about the memory control unit 14, the cache memory 15, and the main memory 16 because they have no direct connection to the present invention. It suffices to say that the main memory 16 is loaded with an address conversion or translation table for converting or translating virtual addresses into corresponding real addresses assigned to the main memory 16 and that the cache memory 16 cooperates with the address control device 11.

The address control device 11 is operable to convert each virtual address signal VA into the real address signal RA indicative of a real address corresponding to each virtual address in a manner to be described later. In addition, the request code signal QC, and the storage data signal DS are sent through the address control device 11 to the memory control unit 14 in a known manner.

Figure 2:
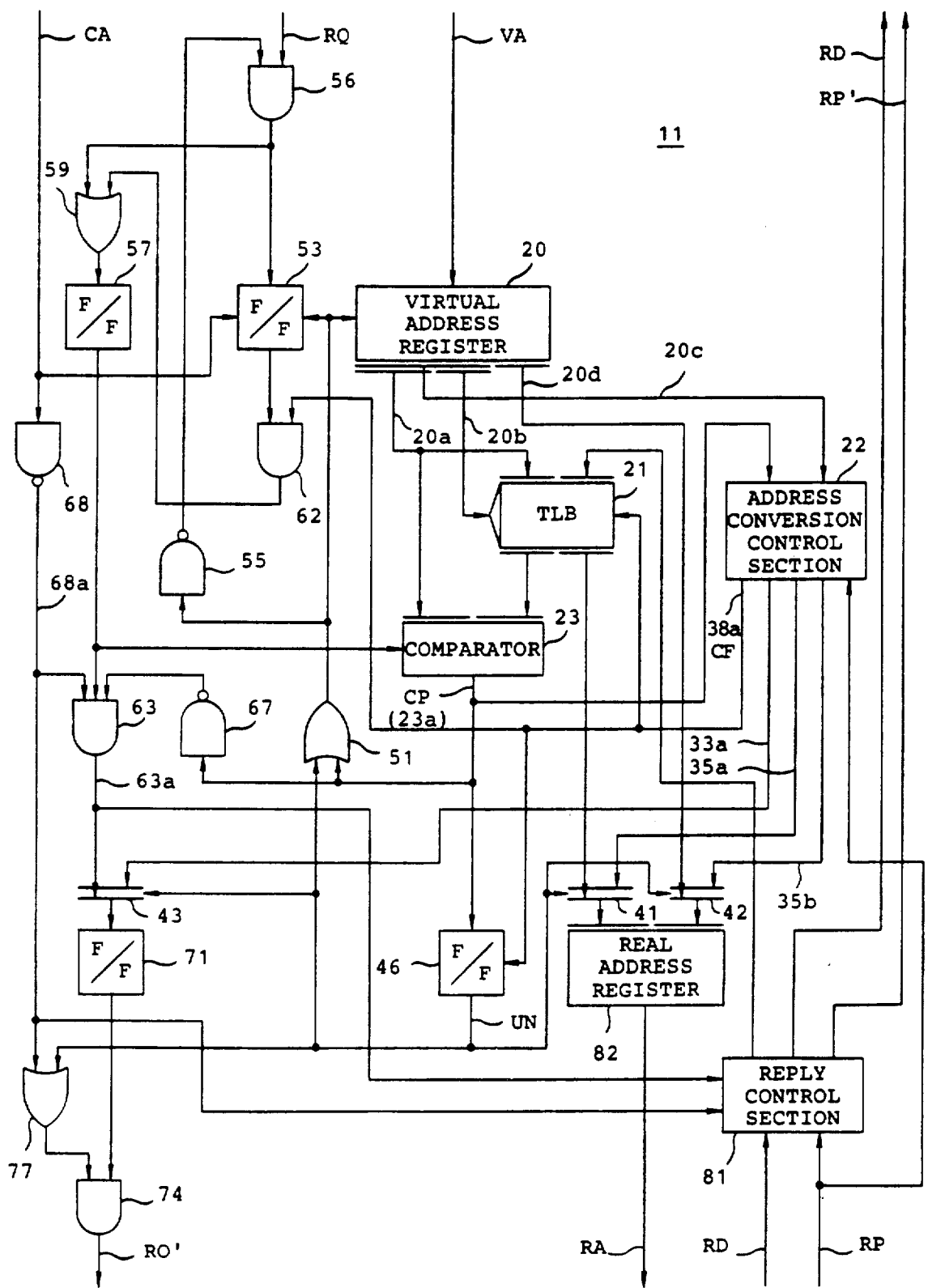
FIG. 2 is a block diagram of an address control device according to a preferred embodiment of this invention.

Referring to FIG. 2 together with FIG. 1, the address control device 11 is supplied from the execution processing unit 12 with the request signal RQ, the virtual address signal VA, and the cancellation signal CA. The request signal RQ is modified into the modified request signal RQ' in accordance with the cancellation signal CA in a manner to be described. The virtual address signal VA is converted or translated into the real address signal RA, as will become clear.

On the other hand, the reply data signal RP and the readout data signal RD are sent from the memory control unit 14 to the address control device 11 and are delivered to the execution processing unit 12 in a manner to be described in detail.

Figure 3:
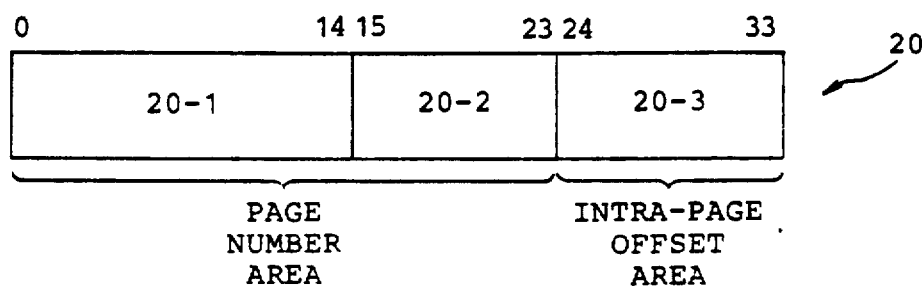
FIG. 3 is a view for use in describing a virtual address signal supplied with the address control device illustrated in FIG. 2.

Temporarily referring to FIG. 3 in addition to FIG. 2, each input virtual address signal VA is representative of a virtual address of thirty-four bits numbered 0 through 33 and is kept in a virtual address register 20. The virtual address register 20 has first through third partial areas 20-1, 20-2, and 20-3 which have bit lengths equal to fifteen bits, nine bits, and ten bits, respectively. The first and the second partial areas 20-1 and 20-2 are loaded with first and second partial page number fields of each input virtual address signal VA and may therefore be collectively called a page number area. The third partial area 20-3 is loaded with an offset field within a page specified by a combination of the first and second partial page number fields of each input virtual address signal VA and may be referred to as an intrapage offset area. At any rate, each virtual address signal VA is kept in the virtual address register 20 as a kept virtual address signal.

If the kept virtual address signal is valid, the first and the second partial page number fields 20-1 and 20-2 of the kept virtual address signal are sent to a translation lookaside buffer (TLB) 21 through first and second signal lines 20a and 20b, respectively, and to an address conversion or translation control section 22 through a third signal line 20c. In addition, the first partial page number field is also sent to a comparator 23.

Figure 4:
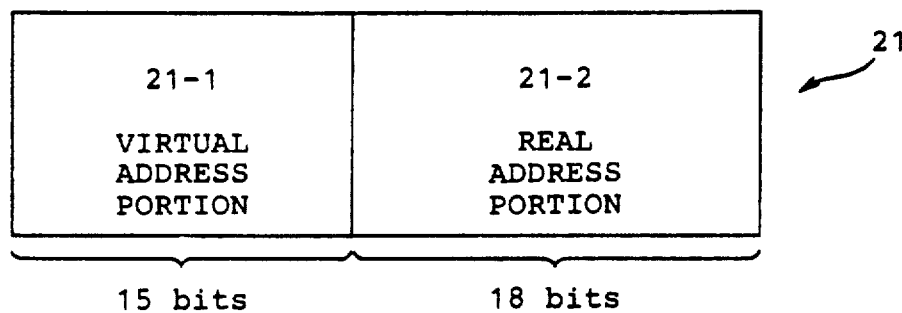
FIG. 4 is a view of r use in describing a table lookaside buffer included in the address control device illustrated in FIG. 2.

Referring to FIG. 4, the TLB 21 has addresses which are equal in number to $2^8$ and each of which is divided into a virtual address portion 21-1 of fifteen bits and a real address portion 21-2 of eighteen bits. From this fact, it is readily understood that the second partial page number field of the kept virtual address signal is given to the TLB 21 as an address signal which indicates a position to be written or read while the first partial page number field of the kept virtual address signal is kept at the position specified by the second partial page number field.

Under the circumstances, the real address portion 21-2 is loaded with a partial real address signal of eighteen bits at each position indicated by the second partial page number field, as will later become clear. Thus, the real address portion 21-2 stores a plurality of the partial real address signals each of which serves as a real page address of the main memory 16. In this connection, it may be said that each partial real address signal stored in the real address portion 21-2 specifies a leading address of each real page address.

Herein, it is assumed that the virtual and the real address portions 21-1 and 21-2 of the TLB 21 have already been loaded with a plurality of first partial page number fields and the corresponding partial real address signals. The first partial page number fields loaded in the virtual address portion 21-1 may be simply referred to as partial virtual address signals.

Under the circumstances, let a specific virtual address signal be sent as the input virtual address signal VA from the execution processing unit 12 and kept in the virtual address register 20. The first partial page number field of the specific virtual address signal is delivered to the comparator 23 and the TLB 21, respectively. In this case, the second partial page number field is given to the TLB 21 as a readout address. Accessed by the second partial page number field, the TLB 21 produces a selected one of the partial virtual address signals held at a position specified by the second partial page number field. Simultaneously, a selected one of the partial real address signals is also read out of the real address portion 21-2 and specifies a leading address of a specific real page address corresponding to the second partial page number field of the specific virtual address signal kept in the virtual address register 20. Such a leading address may be called a leading real page address.

Supplied with the first partial page number field of the specific virtual address signal and the selected partial virtual address signal, the comparator 23 compares the first partial page number field with the selected partial virtual address signal to produce a comparison result signal CP representative of a result of comparison. If incoincidence is detected between the first partial page number field and the selected partial virtual address signal, the comparison result signal CP takes a logic "1" level. Otherwise, the comparison result signal CP takes a logic "0" level. The above-mentioned incoincidence shows that no leading real page address is stored or present in the TLB21 in correspondence to the specific input virtual address signal. Accordingly, the comparison result signal CP of the logic "1" level may be called an absent signal.

The comparison result signal CP is sent through a signal line depicted at 23a to the address conversion control section 22 and also to any other circuit elements which will be described later in detail.

Figure 5:
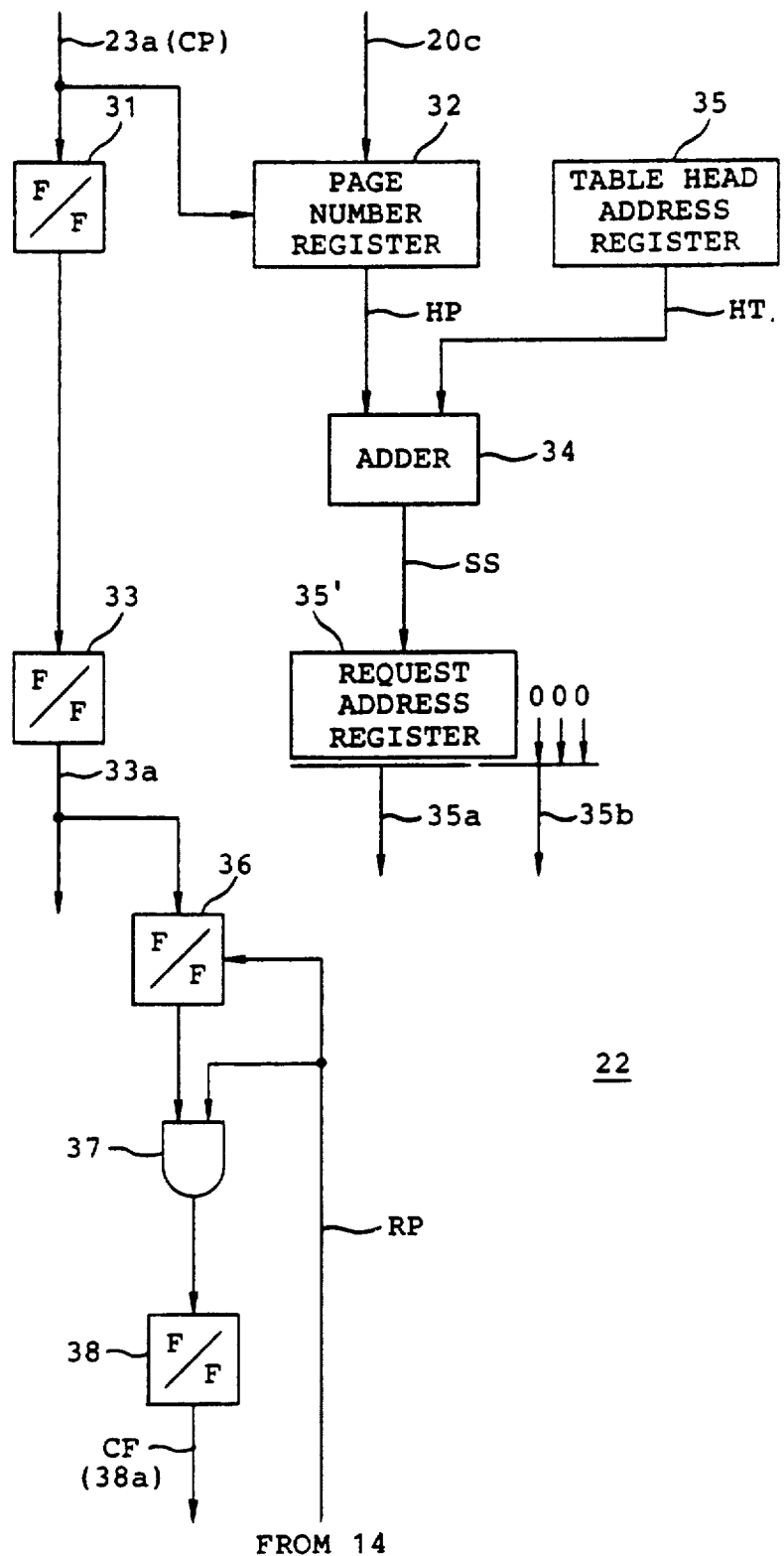
FIG. 5 is a block diagram of an address conversion control section used in the address control device.

Referring to FIG. 5 in addition to FIG. 2, the address conversion control section 22 is put into an active state in response to the comparison result signal CP of the logic "1" level. Specifically, the address conversion control section 22 is energized on detection of the incoincidence in the comparator 23 to look up the address conversion table stored in the main memory 16 (FIG. 1) and to receive a reply signal RP sent from the memory section 13.

To this end, the address conversion control section 22 comprises an address conversion or translation start flip-flop (F/F) 31 and a page number register 32 for storing the comparison result signal CP and the first and the second partial page number fields of the specific virtual address signal, respectively. The first and the second partial page number fields are sent from the virtual address register 20 to the page number register 32 through the third signal line 20c and are kept in the page number register 32 when the comparison result signal CP takes the logic "1" level.

Herein, it is to be noted that an address storing operation must be carried out so as to fetch a preselected number of real addresses from the main memory 16 when no leading real page address is stored in the TLB 21 in relation to the specific virtual address kept in the virtual address register 20 (FIG. 2). In this event, the main memory 16 must be accessed with the address conversion control section 22 kept in the active state.

Responsive to the comparison result signal CP of the logic "1" level, the address conversion start flip-flop 31 (FIG. 6) is set into the logic "1" level which is fed to a request flag register 33 to set the logic "1" level also in the request flag register 33. The logic "1" level of the request flag register 33 is produced through a request flag signal line 33a as a local request signal. The local request signal is delivered to the memory control unit 14 (FIG. 1) as the modified request signal RQ' in a manner to be described later.

Moreover, the first and the second partial page number fields of the specific virtual address signal are sent collectively as a held page number signal HP from the page number register 32 to an adder 34 connected to a table head address register 35 which keeps a head address signal HT specifying a table head address of the address conversion table stored in the main memory 16. The table head address is given in the form of a real address.

The adder 34 adds the held page number signal HP to the head address signal HT to produce a sum signal SS representative of a sum of the table head address and a page number specified by the held page number signal HP. From this fact, it is seen that the above-mentioned sum specifies a page address which corresponds to the specific virtual address signal kept in the virtual address register 20.

The sum signal SS is sent from the adder 34 to a request address register 35' and is held as a request address signal in the request address register 35' of twenty-five bits. In this connection, the request address signal also has twenty-five bits which can be divided into a higher significant part of eighteen bits and a lower significant part of seven bits.

The higher significant part of eighteen bits is produced as a first address signal of eighteen bits from the request address register 35' through a first address signal line 35a. On the other hand, the lower significant part of seven bits is combined with three bits of "000" into a second address signal of ten bits. The three bits of "000" form lower significant bits of the second address signal. The second address signal is produced from the request address register 35' through a second address signal line 35b.

During the address storing operation, the address conversion control section 22 is kept in the active state, as mentioned before. For this purpose, the request flag register 33 is connected to a reply wait flip-flop 36 for waiting for the reply signal RP sent from the memory control circuit 14. Specifically, the reply wait flip-flop 36 is set in response to the local request signal and is reset in response to the reply signal RP. As a result, the reply wait flip-flop 36 supplies a reply wait flag signal of the logic "1" level to an AND gate 37 during a set state thereof. Responsive to the reply wait flag signal and the reply signal RP, the AND gate 37 is momentarily opened to send a gate output signal of the logic "1" level to a completion flag flip-flop 38. The gate output signal of the logic "1" level is representative of completion of the address storing operation and is produced as a completion flag signal CF from the completion flag flip-flop 38 through a completion flag signal line depicted at 38a.

Referring back to FIG. 2, the first address signal line 35a is connected to a first selector 41 together with the real address portion 21-2 (FIG. 4) of the TLB 21 while the second address signal line 35b is connected to a second selector 42 connected to the intra-page offset area 20-3 of the virtual address register 20 through a fourth signal line depicted at 20d. Likewise, the request flag signal line 33a is connected to a third selector 43.

As shown in FIG. 2, the first through third selectors 41 to 43 are controlled by a flip-flop signal of a flip-flop 46 which is set by the comparison result signal CP of the logic "1" level and reset by the completion flag signal CF of the logic "1" level sent through the completion flag signal line 38a. This shows that the flip-flop 46 produces a logic "1" signal as the flip-flop signal in the course of or under the address storing operation and may be called an "under operation" flip-flop. In this connection, the flip-flop signal of the "under operation" flip-flop 46 will be called an "under operation" signal UN of the logic "1" level or an internal control signal.

The "under operation" signal UN is sent not only to the first through third selectors 41 to 43 but also to a first OR gate 51 which is supplied with the comparison result signal CP. The first OR gate 51 controls the virtual address register 20 and is connected to an address validity flip-flop 53 and a first inverter 55. The first inverter 55 is connected to a first AND gate 56 to which the request signal RQ is given from the execution processing unit 12 and which is further connected to the address validity flip-flop 53 and to a cycle validity flip-flop 57 through a second OR gate 59.

With this structure, the first OR gate 51 delivers the logic "1" level signal to the address validity flip-flop 53, the virtual address register 20, and the first inverter 55 when the comparison result signal CP of the logic "1" level is produced by the comparator 23 or is kept in the "under operation" flip-flop 46 as the "under operation" signal UN.

The address validity flip-flop 53 is put into a set state in response to the logic "1" level signal sent from the first AND gate 56 and is kept in a hold state in response to the logic "1" level signal sent as a hold indication signal from the first OR gate 51. In addition, the address validity flip-flop 53 is put into a reset state in response to the cancellation signal CA. When the hold indication signal and the cancellation signal CA are simultaneously produced from the first OR gate 51 and the execution processing unit 12, respectively, the cancellation signal CA is processed in preference to the hold indication signal. The resultant address validity flip-flop 53 is put into the reset state on simultaneous reception of the hold indication signal and the cancellation signal.

Anyway, the set and the reset states of the address validity flip-flop 53 are indicative of validity and invalidity of the specific virtual address signal kept in the virtual address register 20, respectively. Accordingly, it may be said that the address validity flip-flop 53 produces a valid signal and an invalid signal representative of the validity and the invalidity of the specific virtual address signal when put into the set and the reset states, respectively.

A second AND gate 62 is connected to the address validity flip-flop 53 and the address conversion control section 22 through the completion flag signal line 38a. In consequence, the second AND gate 62 supplies the logic "1" level signal to the second OR gate 59 when the address validity flip-flop 53 produces the valid signal with the completion flag signal CF of the logic "1" level fed from the address conversion control section 22.

Therefore, the cycle validity flip-flop 57 is put into a set state either when the address storing operation is completed or when the first AND gate 56 produces the logic "1" level signal. In the set state, the cycle validity flip-flop 57 produces a valid cycle signal of the logic "1" level which is indicative of validity of the request signal RQ. In other words, the valid cycle signal serves as a flag representative of a time instant which defines a cycle for the request signal RQ accompanying the input virtual address signal VA. The valid cycle signal is delivered to the comparator 23 on one hand and to a third AND gate 63.

The third AND gate 63 is also supplied with the comparison result signal CP through a second inverter 67 and with the cancellation signal CA through a third inverter 68. Therefore, the third AND gate 63 supplies the logic "1" level signal to the third selector 43 when the valid cycle signal alone is given from the cycle validity flip-flop 57 with neither the comparison result signal CP nor the cancellation signal CA produced. In this event, the request signal RQ is delivered as the valid cycle signal from the first AND gate 56 to the third AND gate 63 through the section OR gate 59 and the cycle validity flip-flop 57.

From this fact, it is understood that the third selector 43 is supplied with the request signal RQ through the above-mentioned passage and with the local request signal from the address conversion control section 22 through the request flag signal line 33a (FIG. 5). The third selector 43 selects either the request signal RQ or the local request signal in accordance with the "under operation" signal UN to supply a selected signal to a request flag register or flip-flop 71. The selected signal is kept in the request flag flip-flop 71 and is sent through a fourth AND gate 74 as the modified request signal RQ' as long as the cancellation signal CA is not given from the execution processing unit 12. This is because the cancellation signal CA is supplied to the fourth AND gate 74 through the third inverter 68 and a third OR gate 77 to which the "under operation" signal UN is given from the "under operation" flip-flop 46.

In the absence of the cancellation signal CA and the "under operation" signal, the request signal RQ is sent through the first AND gate, 56, the second OR gate 59, the cycle validity flip-flop 57, and the third AND gate 63 to the third selector 43 and is selected by the third selector 43 to be produced as the modified request signal RQ'.

On the other hand, the local request signal is produced as the modified request signal RQ' in spite of the presence of the cancellation signal CA. This means that the modified request signal RQ' is not cancelled even in the presence of the cancellation signal CA as long as the local request signal is produced from the address conversion control section 22. In other words, the address storing operation is continued or validated between the address control device 11 and the memory section 13 even on appearance of the cancellation signal CA during production of the local request signal and the "under operation" signal UN.

The address storing operation of the TLB 21 is carried out in cooperation with a reply control section 81 by the use of a real address register 82 connected to the first and the second selectors 41 and 42. For this purpose, the illustrated reply control section 81 is connected to the third AND gate 63 and the third inverter 68 through first and second internal signal lines depicted at 63a and 68a, respectively, and is given the reply signal RP and the readout data signal RD from the memory section 13.

Therefore, the flip-flops 46, 53, 57, and 71, the AND gates 56, 62, 63, and 74, the OR gates 51, 59, and 77, the inverters 55, 67, and 68, and the third selector 43 are operable to validate the address storing operation of the TLB 21 and may be therefore referred to as a validity control circuit arrangement.

Figure 6:
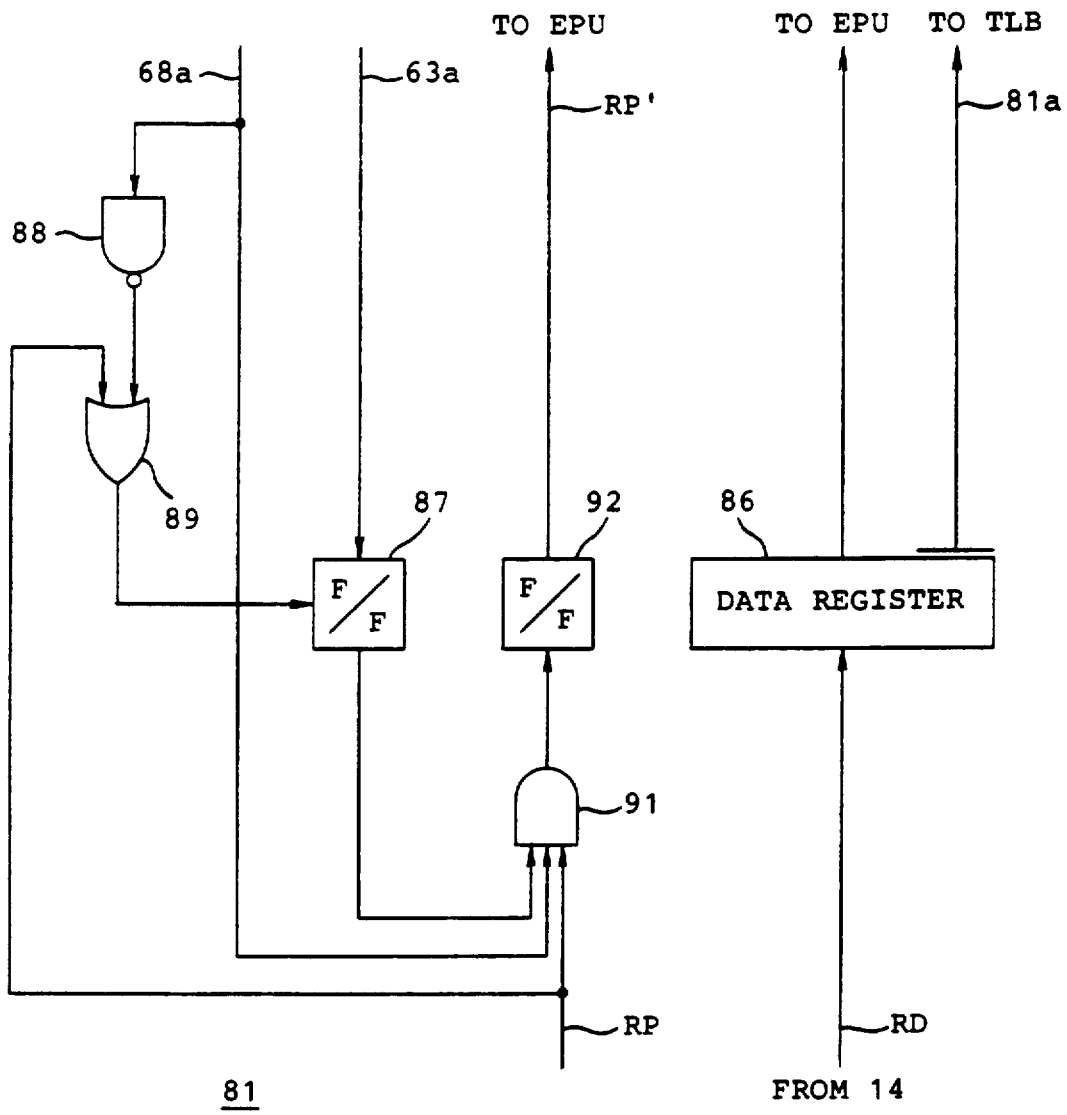
FIG. 6 is a block diagram of a reply control section used in the address control device.

Referring to FIG. 6 together with FIG. 2, the reply control section 81 comprises a date register 86 which has a bit capacity of, for example, seventy-two bits and which is supplied with the readout data signal RD. The readout data signal RD is delivered from the data register 86 to the execution processing unit 12 while eighteen lower significant bits of the readout data signal RD is delivered to the TLB 21 through a data line depicted at 81a.

The reply signal RP is given from the memory section 13 to the reply control section 81 and sent as the controlled reply signal RP' to the execution processing unit 12 in a manner to be presently described. Herein, it is to be recollected that the request signal RQ appears on the first internal signal line 63a in the form of the logic "1" level signal in the absence of the cancellation signal CA and the "under operation" signal UN and that the logic "1" level signal appears on the second internal signal line 68a in the absence of the cancellation signal CA.

The first internal signal line 63a is connected to a reply wait flag flip-flop 87 while the second internal signal line 68a is connected to the reply wait flag flip-flop 87 through an inverter 88 and an OR gate 89 on one hand and is connected direct to an AND gate 91 on the other hand. The AND gate 91 is supplied with the reply signal RP, an output signal of the reply wait flag flip-flip 87, and the logic signal on the first internal signal line 63a. An output signal of the AND gate 91 is sent through a reply flag flip-flop 92 to the execution processing unit 12 as the controlled reply signal RP'.

With this structure, the reply wait flag flip-flop 87 is put into a set state in response to the request signal RQ sent through the first internal signal line 63a in the above-mentioned manner and is put into a reset state in response to the reply signal RP delivered to the reply wait flag flip-flop 87 through the OR gate 89.

The reply wait flag flip-flop 87 is also reset when the cancellation signal CA is sent through the third inverter 68 (FIG. 2), the inverter 88, and the OR gate 89 to the replay wait flag flip-flop 87. This means that the replay signal RP is interrupted by the AND gate 91 and no controlled reply signal RP' is fed to the execution processing unit 12 when the cancellation signal CA is given from the execution processing unit 12.

As shown in FIG. 2 the reply signal RP is directly sent to the address conversion control section 22 to operate the same in the above-mentioned manner while the controlled reply signal RP' is delivered to the execution processing unit 12.

Let consideration be made about the first through third selectors 41 to 43 which carry out selecting operation in accordance with the "under operation" signal UN. The first selector 41 is supplied with the first address signal of eighteen bits through the first address signal line 35a and with the leading real page address signal, specifically, the selected partial real address signal of eighteen bits from the real address portion 21-2 (FIG. 4) of the TLB 21. The second selector 42 is supplied with the offset field of the specific virtual address signal kept in the virtual address register 20 and with the second address signal of ten bits through the second address signal line 35b.

The first and the second selectors 41 and 42 select the leading real page address signal and the offset field in the absence of the "under operation" signal to set a real address signal into the real address register 82 in a usual manner. In this event, the memory section 13, especially, the cache memory 15 is accessed by the real address signal kept in the real address register 82.

On the other hand, the first and the second selectors 41 and 42 select the first and the second address signals sent from the address conversion control section 22 when the "under operation" signal UN is produced by the "under operation" flip-flop 46. In this case, a real address signal is kept in the real address register 82 to be delivered to the memory section 13.

Description has already been made as regards the third selector 43 operable to produce the modified request signal RQ. Therefore, the third selector 43 will not be described any longer.

In any event, the reply signal RP and the readout data signal RD are sent back from the memory section 13 to the replay control section 81.

As mentioned above, a combination of the address conversion control section 22, the comparator 23, and the replay control section 81 is operable in cooperation with the first and the second selectors 41 and 42 and the real address register 82 during production of the local request signal to control the address storing operation of the TLB 21 in relation to the specific virtual address signal kept in the virtual address register 20. In this connection, the above-mentioned combination, the first and the second selectors 41 and 42, and the real address register 82 may be referred to as a storing operation control arrangement.

Figure 7:
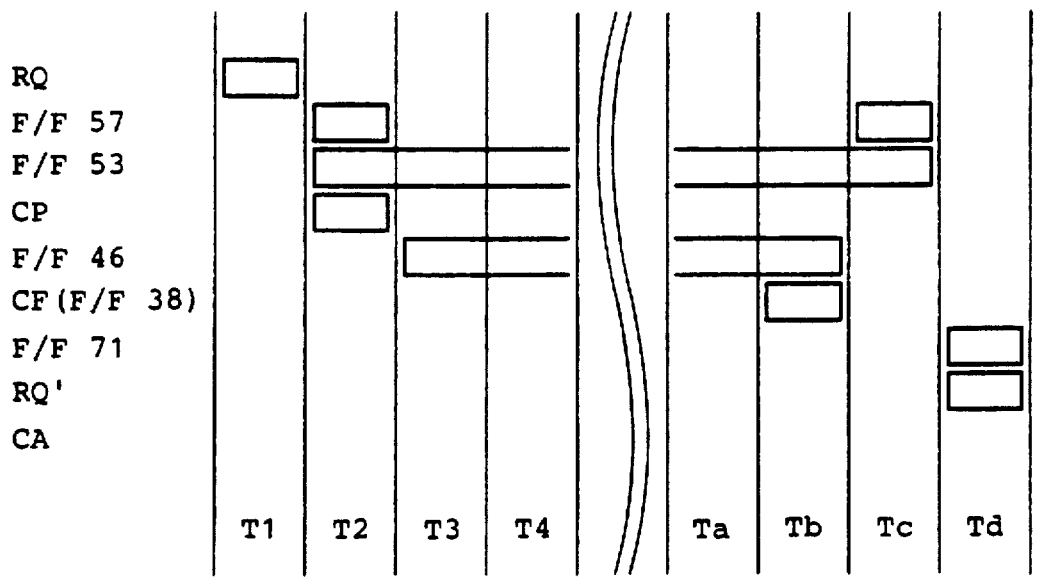
FIG. 7 is a time chart for use in describing operation of the address control device.

Referring to FIG. 7 in addition to the FIG. 2, operation will be described in detail, provided that the execution processing unit 12 sends no cancellation signal CA to the address control device 11 as a result of the fact that instructions are favorably prefetched in the execution processing unit 12. In FIG. 7, first through fourth consecutive intervals T1 to T4 of time are shown along the abscissa together with first through fourth additional consecutive intervals Ta, Tb, Tc, and Td spaced apart from the fourth interval T4. The request signal RQ of the logical "1" level is produced from the execution processing unit 12 within the first interval T1 of time and is sent to the cycle validity flip-flop 57 and the address validity flip-flop 53. It is assumed in FIG. 7 that both the comparison result signal CP and the "under operation" signal UN are absent within the first interval T1 and therefore take the logic "0" levels, respectively.

Under the circumstances, the cycle validity flip-flop 57 is put into the set state through the first AND gate 56 and the second OR gate 59 within the second interval T2 to produce the logic "1" level signal. Likewise, the address validity flip-flop 53 is put into the set state through the first AND gate 56. The input virtual address signal VA is set into the virtual address register 20 within the second interval T2, although not shown in FIG. 7. Within the second interval T2, the comparator 23 is enabled by the cycle validity flip-flop 57 to carry out the above-mentioned comparison and to produce the comparison result signal CP. Specifically, the first partial page number field of fifteen bits kept in the virtual address register 20 is compared with the selected partial page address read out of the TLB 21. At any rate, the comparison result signal CP is delivered from the comparator 23 to the address conversion control section 22, the first OR gate 51, and the second inverter 67.

If the comparison result signal CP becomes the logical "1" level as a result of incoincidence between the first partial page number field and the selected partial page address, the address storing operation begins in the address conversion control section 22 in the manner described before. Otherwise, a real address signal is sent to the memory section 13 to receive the reply signal RP and the reply data signal RD in a useful manner.

Description will be made on the assumption that the comparison result signal CP becomes the logic "1" level in the second interval T2. In this situation, the "under operation" flip-flop 46 is put into the set state within the third interval T3 to produce the "under operation" signal UN. The address validity flip-flop 53 is held in the set state in response to the "under operation" signal UN delivered from the "under operation" flip-flop 46 through the first OR gate 51. Likewise, the virtual address register 20 is put into the hold state to keep the input virtual address signal VA.

On production of the "under operation" signal UN, the first AND gate 56 is closed through the first OR gate 51 and the first inverter 55. As a result, reception of the following request signal RQ is rejected on production of the "under operation" signal UN and the cycle validity flip-flop 57 is put into the reset state in the third interval T3.

In the address conversion control section 22, the address storing operation is started in response to the comparison result signal CP of the logic "1" level produced in the second interval T2 and lasts until the completion flag signal CF is produced from the address conversion control section 22 in the above-mentioned manner. More particularly, the comparison result signal CP is kept in the address conversion flip-flop 31 (FIG. 5) of the address conversion control section 22. Simultaneously, the first and the second partial page number fields are sent from the virtual address register 20 and held as a held page number signal HP of twenty-four bits in the page number register 32 (FIG. 5) in the second interval T2.

In the third interval T3, the adder 34 adds the held page number signal HP to the head address signal HT to calculate an address of an entry which corresponds to the specific virtual address signal kept in the virtual address register 20 and which is stored as a request address signal in the request address register 35'. The request flag flip-flop 33 is put into the set state in the third interval T3 and the reply wait flip-flop 36 is thereafter put into the set state.

In FIG. 7, the "under operation" signal UN of the logic "1" level appears from the third interval T3 until the second additional interval Tb. During the "under operation" signal UN, the local request signal is sent as the modified request signal RQ' from the address conversion control section 22 to the memory section 13 through the request flag signal line 33a, the third selector 43, the request flag flip-flop 71, and the fourth AND gate 74. Likewise, the first and the second address signals are sent as a real address signal RA from the address conversion control section 22 to the memory section 13 through the first and the second address lines 35a and 35b, the first and the second selectors 41 and 42, and the real address register 82.

Further referring to FIG. 7, it is assumed that the reply signal RP is returned back to the address control device 11 in response to the above-mentioned modified request signal RQ'.

Responsive to the reply signal RP, the AND gate 37 (FIG. 5) is momentarily opened to supply the logic "1" level signal to the completion flag flip-flop 38 (FIG. 5). The completion flag signal CF is delivered within the second additional interval Tb from the address conversion control section 22 to the "under operation" flip-flop 46, the second AND gate 62, and the TLB 21.

The readout data signal RD is kept in the data register 86 (FIG. 6) of the reply control section 81 within the second additional interval Tb.

Supplied with the completion flag signal CF, the TLB 21 is enabled in the second additional interval Tb. As a result, the first partial page number field of fifteen bits (20-1) is kept in the virtual address register 20 and is stored into the virtual address portion 21-1 (FIG. 4). Likewise, the eighteen lower significant bits of the readout data signal RD are sent from the data register 86 (FIG. 6) to the real address portion 21-2 (FIG. 4) of the TLB 21 and is stored as a page head address or a leading real page address.

During production of the completion flag signal CF, the cycle validity flip-flop 57 is supplied with the logic "1" level signal through the second AND gate 62 and the second OR gate 59 because the address validity flip-flop 53 is kept in the set state during the second additional interval Tb. Therefore, the cycle validity flip-flop 57 is put into the set state at the end of the second additional interval Tb, namely, at the beginning of the third additional interval Tc. Concurrently, the "under operation" flip-flop 46 is put into the reset state with the completion flag signal CF extinct.

As a result of the above-mentioned address storing operation, the page head address is stored in the TLB 21 within the second additional interval Tb and corresponds to the page number indicated by the specific virtual address signal.

Accordingly, the completion flag signal CF becomes the logic "0" level at the beginning of the third additional interval Tc in response to the specific virtual address signal kept in the virtual address register 20. Within the third additional interval Tc, the virtual address register 20 continuously holds the specific virtual address signal with the cycle validity flip-flop 57 kept in the set state. Inasmuch as no "under operation" signal is delivered form the "under operation" flip-flop 46 to the first through third selectors 41 to 43, the request flag flip-flop 71 is set through the third AND gate 63 and the third selector 43 while the first and the second selectors 41 and 42 select a page head address signal and an offset field of ten bits which are stored in the TBL 21 and the virtual address register 20, respectively. A real address signal RA is formed by a combination of the above page head address signal and the offset field and is kept into the real address register 82.

Under the circumstances, the request signal RQ is sent as the modified request signal RQ' to the memory section 13 within the fourth additional interval Td through the fourth AND gate 74. Simultaneously, the real address signal RA is delivered from the real address register 82 to the memory section 13.

Figure 8:
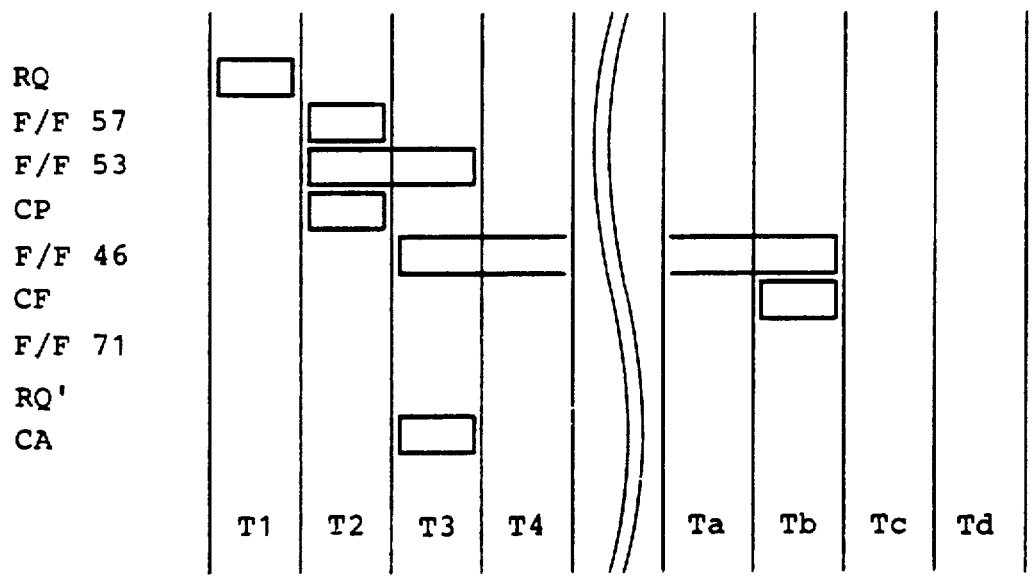
FIG. 8 is a time chart for use in describing another operation of the address control device.

Referring to FIG. 8 together with FIG. 2, description will be made about the operation which is carried out on supply of the cancellation signal CA from the execution processing unit 12. Such operation is assumed to be made on a time scale divided into first through fourth consecutive intervals of time and first through fourth additional consecutive intervals of time, like in FIG. 7. In FIG. 8, the cancellation signal CA is delivered from the execution processing unit 12 to the address control device 11 within the third interval T2. In this connection, the address control device 11 is operable in a manner similar to that illustrated in FIG. 7 within the first and the second intervals T1 and T2 prior to reception of the cancellation signal CA. Therefore, the cycle validity flip-flop 57 and the address validity flip-flop 53 are put into the set states within the second interval T2 in response to the request signal RQ issued from the execution processing unit 12 within the first interval T1. The comparison result signal CP is produced from the comparator 23 during the second interval T2 and takes the logic "1" level when incoincidence is detected in the above-mentioned manner.

Under the circumstances, the "under operation" flip-flop 46 is put into the set state at the beginning of the third interval T3. When the cancellation signal CA is sent from the execution processing unit 12 within the third interval T3, the address validity flip-flop 53 is reset at the end of the third interval T3, specifically, at the beginning of the fourth interval T4. However, the "under operation" flip-flop 46 is kept in the set state. This shows that the virtual address register 20 remains in the hold state.

The address conversion control section 22 starts the address storing operation in response to the comparison result signal CP of the logic "1" level and continues the address storing operation in spite of reception of the cancellation signal CA. Consequently, the TLB 21 is loaded in the above-mentioned manner with the page head address corresponding to the specific virtual address signal kept in the virtual address register 20.

During the production of the "under operation" signal UN, the local request signal is sent from the address conversion control section 22 as the modified request signal RQ' through the third selector 43, the request flag flip-flop 71, and the fourth AND gate 74, with the cancellation signal CA suppressed by the third inverter 68 and the third OR gate 77.

In FIG. 8, the completion flag signal CF is sent from the address conversion control section 22 to the "under operation" flip-flop 46 within the second additional interval Tb. As a result, the "under operation" flip-flop 46 is put into the reset state at the end of the third additional interval Tc.

The address validity flip-flop 53 is already reset in response to the cancellation signal CA received within the third interval T3. Therefore, the second AND gate 62 remains closed even when the completion flag signal CF of the logic "1" level is given to the second AND gate 62.

Within the second additional interval Tb, the "under operation" flip-flop 46 is kept in the set state yet. Under the circumstances, the cycle validity flip-flop 57 is kept in the reset state because the first inverter 55 and the first AND gate 56 are closed.

This shows that the request signal RQ is not executed in the address control device 11 when it is issued in the first interval T1 and cancelled during the address storing operation.

Herein, it is surmised that an additional request signal RQ is issued after the second additional interval Tb from the execution processing unit 12 and accompanies the same virtual address signal as the above request signal RQ issued within the first interval T1. In this event, the address storing operation has already been completed after the second additional interval Tb about the virtual address signal in question. This shows that the page head address for the virtual address signal in question is stored in the TLB 21. No address storing operation is therefore necessary in the address conversion control section 22.

What is claimed is:

1. An address control system operable in response to a succession of indications, each of said indications issuing from an execution processing unit to indicate an access operation by said processing unit to access a memory section, including a main memory and a cache memory for said main memory, and each of said indications including an input virtual address, said address control system comprising:

(1) high capacity address storing means, separate from said memory section, for storing a plurality of partial virtual addresses and a plurality of partial real addresses, each of said partial virtual addresses corresponding to a respective one of said partial real addresses, said address storing means, when accessed by said input virtual address indicating a required partial virtual address having a corresponding required partial real address, producing one of a presence signal and an absence signal representing, respectively, whether said required partial real address is present or absent as one of said partial real addresses in said address storing means;

(2) storing control means, responsive to said input virtual address and selectively responsive to one of said presence signal and said absence signal, for controlling said address storing means to cause said address storing means to carry out an address readout operation of said required partial real address from said address storing means in response to said presence signal or to carry out an address accessing operation of said memory section for said required partial real address in response to said absence signal and also to carry out an address storing operation of said required partial real address from said memory section into said address storing means in response to said absence signal, said address storing operation being executed in response to a specific one of said indications, said specific one of said indications being followed by a subsequent one of said indications, said subsequent one of said indications indicating cancellation of said address storing operation carried out in response to said specific one of said indications; and (3) validity control means coupled to said storing control means and responsive to said subsequent one of said indications for causing said storing control means to validly continue to execute said address storing operation in response to said specific one of said indications even when said subsequent one of said indications indicates said cancellation of said address storing operation.

2. An address control system as claimed in claim 1, wherein:

said address storing means comprises
(a) an address storage unit for storing said plurality of partial virtual addresses and said plurality of partial real addresses,
(b) selective signal producing means responsive to said input virtual address and coupled to said storage unit for selectively producing one of said presence signal and said absence signal when said address storage unit is accessed by said input virtual address and
(c) completion signal producing means coupled to said memory section for producing a completion signal representative of completion of said address storing operation; and said validity control means comprises
(a) control signal producing means, coupled to said selective signal producing means and coupled to said completion signal producing means, for storing said absence signal until reception of said completion signal and for producing an internal control signal representing continuation of said address storing operation and
(b) rejection means, coupled to said execution processing unit and responsive to said internal control signal, for rejecting reception of said subsequent one of said indications during reception of said internal control signal for providing for said continuation of said address storing operation.

3. A method of controlling an access operation of an execution processing unit for accessing a memory section, including a main memory and a cache memory for said main memory, by an address control device, said address control device operating in response to a succession of indications from said execution processing unit to indicate said access operation, comprising the steps of:

(1) supplying to said address control device an input virtual address included in each of said indications, said input virtual address including a required partial virtual address;

(2) storing in high capacity address storing means, separate from said memory section, located in said address control device a plurality of partial virtual addresses and a plurality of partial real addresses, each of said partial virtual addresses corresponding to a respective one of said partial real addresses;

(3) accessing said address storing means with said input virtual address to produce one of a presence signal and an absence signal,
 (a) said presence signal representing a presence of a required partial real address corresponding to said required partial virtual address in said address storing means and
 (b) said absence signal representing an absence of said required partial real address corresponding to said required partial virtual address in said address storing means;

(4) controlling said address storing means by storing control means responsive to said input virtual address and selectively responsive to said presence signal and said absence signal to cause said address storing means to carry out one of
 (a) an address readout operation of said required partial real address from said address storing means in response to said presence signal; and
 (b) an address storing operation of said required partial real address from said memory section into said address storing means in response to said absence signal,
 said address storing operation being executed in response to a specific one of said indications,
 said specific one of said indications being followed by a subsequent one of said indications indicating cancellation of said address storing operation carried out in response to said specific one of said indications; and (5) validly continuing said address storing operation in said address control device without cancellation, even on reception of said subsequent one of said indications indicating said cancellation of said address storing operation.

* * * * *